United States Patent
Hajiaghajhani

(10) Patent No.: US 7,649,342 B2
(45) Date of Patent: Jan. 19, 2010

(54) SYSTEM AND METHOD OF CHARGING A BATTERY IN A POWER MANAGEMENT UNIT

(75) Inventor: Masoud Hajiaghajhani, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 280 days.

(21) Appl. No.: 11/635,644

(22) Filed: Dec. 8, 2006

(65) Prior Publication Data

US 2008/0136368 A1 Jun. 12, 2008

(51) Int. Cl.
*H02J 7/16* (2006.01)
*G06F 1/00* (2006.01)

(52) U.S. Cl. .................. 320/153; 320/140; 713/340

(58) Field of Classification Search .......... 320/106, 320/107, 110, 111, 112, 114, 116, 153, 137, 320/140, 152, 160, 166; 324/433; 365/229; 713/340; 323/271, 273, 282, 283

See application file for complete search history.

(56) References Cited

U.S. PATENT DOCUMENTS

| | | | | |
|---|---|---|---|---|
| 5,307,000 A * | 4/1994 | Podrazhansky et al. | ..... | 320/129 |
| 5,656,923 A * | 8/1997 | Schultz et al. | ..... | 323/207 |
| 5,767,659 A * | 6/1998 | Farley | ..... | 320/106 |
| 5,774,733 A * | 6/1998 | Nolan et al. | ..... | 713/300 |
| 6,025,695 A * | 2/2000 | Friel et al. | ..... | 320/106 |
| 6,348,777 B1 * | 2/2002 | Brown et al. | ..... | 320/160 |
| 6,512,349 B1 * | 1/2003 | Gerhard et al. | ..... | 320/137 |
| 2002/0199131 A1 * | 12/2002 | Kocin | ..... | 714/14 |
| 2003/0102845 A1 * | 6/2003 | Aker et al. | ..... | 320/139 |
| 2004/0085045 A1 * | 5/2004 | Nakamura | ..... | 320/132 |
| 2006/0170391 A1 * | 8/2006 | Lam | ..... | 320/101 |
| 2006/0212737 A1 * | 9/2006 | Chandra et al. | ..... | 713/340 |
| 2006/0226812 A1 * | 10/2006 | Patino et al. | ..... | 320/128 |

* cited by examiner

*Primary Examiner*—Edward Tso
*Assistant Examiner*—M'baye Diao
(74) *Attorney, Agent, or Firm*—Crowell & Moring LLP

(57) ABSTRACT

Exemplary methods and systems for charging a battery in a power management unit include a power regulator having an input power supply and a processor that regulates a charging rate of the battery based on measured parameters of the power regulator and the battery. The processor is programmed to perform exemplary methods that include receiving an output voltage signal and a battery temperature signal from the power regulator, and comparing the output voltage to a first threshold to determine a charge level of the battery. An exemplary method includes selecting a charging mode based on the comparison, and sending a first control signal to the power regulator to adjust a charging rate of the battery based on the battery temperature.

31 Claims, 5 Drawing Sheets

SYSTEM AND METHOD OF CHARGING A BATTERY IN A POWER MANAGEMENT UNIT

BACKGROUND

1. Field

A fuel cell and method for charging a backup battery used for startup of a fuel cell are disclosed.

2. Background Information

Fuel cells have uses in stationary power, automotive power, and space program applications. A single fuel cell can produce a relatively small amount of energy, and when included in a fuel system produces a wide DC voltage that can be regulated. A fuel cell system can include a stack of fuel cells and support systems known as a balance of plant (BOP). A fuel cell system can include a battery backup during startup. The backup battery can provide power to auxiliary equipment until the fuel cell generates enough power to satisfy any desired system requirements. Once the fuel cell is capable of delivering desired power to the system, the backup battery is charged. During the charging process, excessive voltage and/or temperature can damage the battery.

SUMMARY

Exemplary methods are disclosed for charging a battery in a power management unit. An exemplary method comprises measuring a battery parameter. The method comprises determining a charge level of the battery based on the battery parameter. The method also comprises selecting a first charging mode based on the charge level, and adjusting a charge rate of the battery based on a temperature of the battery.

Exemplary embodiments are directed to a processor for charging a battery in a power management unit having a power regulator, wherein the processor is connected to receive measurement signals from the power regulator and is connected to send control signals to the power regulator. The processor is programmed to perform an exemplary method. The method comprises receiving an output voltage signal and a battery temperature signal from the power regulator, and comparing the output voltage to a first threshold to determine a charge level of the battery. The method comprises selecting a first charging mode based on the comparison, and sending a first control signal to the power regulator to adjust a charging rate of the battery based on the battery temperature.

Exemplary embodiments are also directed to a power conditioning circuit for charging a battery. The power conditioning circuit comprises a power regulator having an input power supply. The power conditioning circuit also comprises a processor that regulates a charging rate of the battery based on measured parameters of the power regulator and the battery. The battery is connected across output terminals of the power regulator.

DESCRIPTION OF THE DRAWINGS

In the following, exemplary embodiments will be described in greater detail in reference to the drawings, wherein.

DETAILED DESCRIPTION

Figure 1:
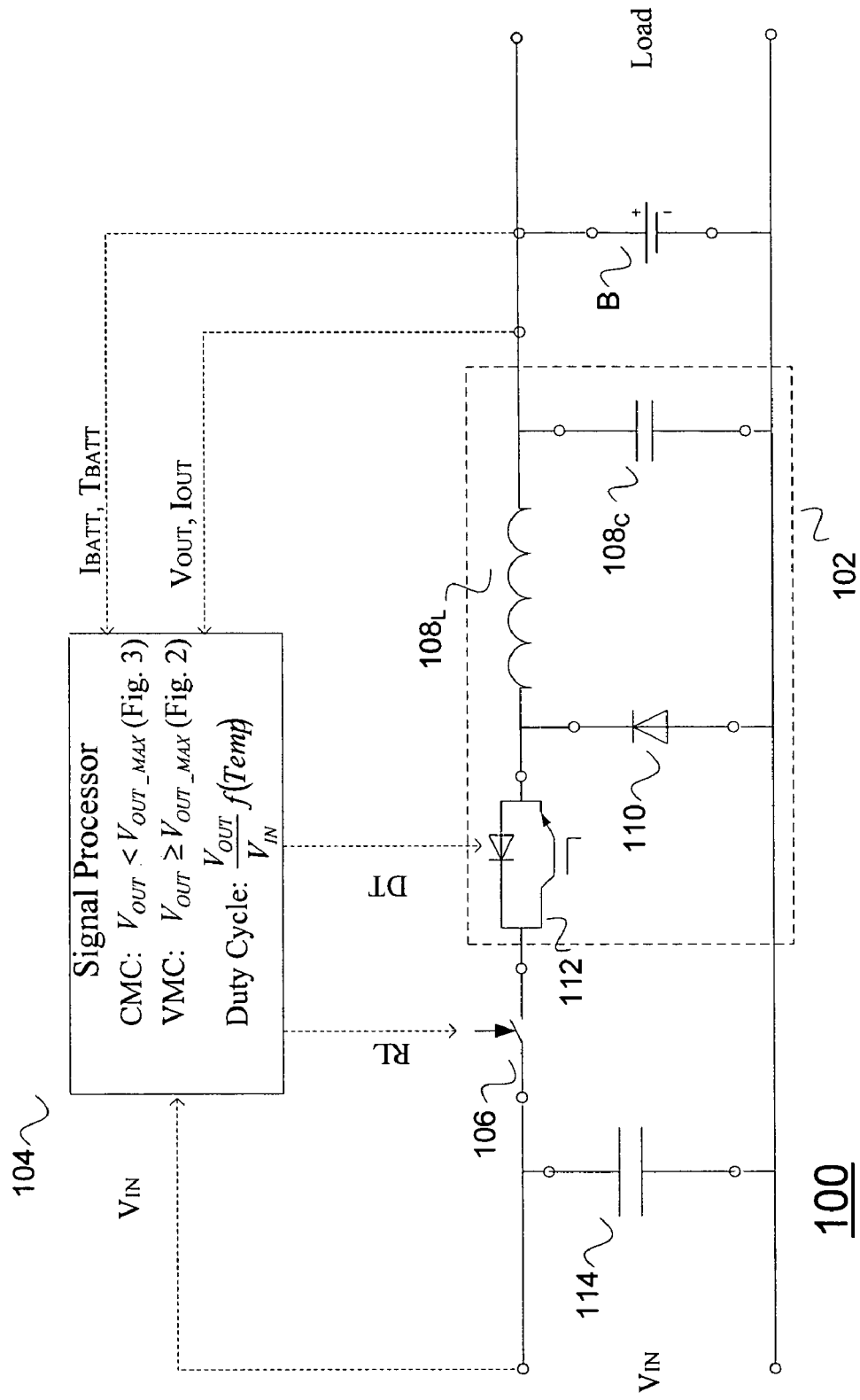
FIG. 1 illustrates an overview of a power conditioning circuit in accordance with an exemplary embodiment.

FIG. 1 is a block diagram of an exemplary embodiment directed to a power management unit (PMU) 100 for charging a battery. For example, a backup battery in a fuel cell system can be charged as a function of battery temperature so that charging limits of the battery are not exceeded during the charging process. The PMU 100 includes means, such as a regulator circuit 102, for regulating the charging rate of the battery (B), and means, such as a processor 104, for controlling the regulating means to adjust the charging rate based on measured voltage and temperature values of the battery (B). The PMU 100 also includes means, such as a relay switch 106, for switchably connecting the regulator circuit 102 to an input power source.

The battery (B) may be any type of charge storage device including, but not limited to, any rechargeable battery that has the capacity to power an associated fuel cell system at startup. The material makeup of the battery (B) may be determined from the startup power requirements of the fuel cell system and other system considerations such as size and weight, for example.

The regulator circuit 102 controls the rate at which an input voltage ($V_{IN}$) and an input current ($I_{IN}$) of the input power source are supplied to the battery (B). The regulator circuit can be implemented as a switched-mode power supply, such as a buck converter or any other suitable device or circuit. An output filter 108 includes an inductor $108_L$ for alternating and smoothing the input current ($I_{IN}$), and a capacitor $108_C$ for alternating and smoothing the input voltage ($V_{IN}$). The values of the inductor $108_L$ and capacitor $108_C$ can be selected so that the input current ($I_{IN}$) and input voltage ($V_{IN}$) levels do not exceed corresponding maximum input current and voltage levels as specified by the battery manufacturer.

The regulator circuit 102 also includes means, such as a diode 110, for directing the flow of current through the inductor $108_C$. The diode 110 ensures that current flows through the inductor $108_L$.

The regulator circuit 102 includes means, such as a transistor switch 112, for controlling the power (input current $I_{IN}$, input voltage $V_{IN}$) supplied to the battery (B).

The transistor switch 112 is connected to receive a control signal generated by the processor 104. The transistor switch 112 is also connected to receive input current ($I_{IN}$) from the input power source via the relay switch 106. The transistor switch 112 may operate at any desired frequency (e.g., either high or low frequencies). For high frequency applications, the transistor switch 112 may be implemented as a power metal-oxide semiconductor field effect transistor (MOSFET) or an insulated gate bipolar transistor (IGBT), for example, or any other suitable device. For low frequency designs, the transistor switch 112 may be implemented as a thyristor, for example, or any other suitable device.

The power MOSFET can be used, for example, in high frequency applications where the input voltage swing is less than a voltage on the order of 100 volts. The IGBT can be used, for example, in high frequency applications having an input voltage swing between 0 and 1000 volts (or greater), the input current swing is between 0 and 1000 amperes (or greater), and the input power is between 10 and 15 kilowatts (or other specified range). For applications in which the input voltage exceeds 1000 volts, a snubber circuit can be implemented to ensure that the operational capacity of the IGBT is not exceeded. Furthermore, parallel IGBT devices can be used as needed in applications having input power greater than 15 kilowatts and an operating temperature greater than 55° C. The foregoing values are by way of example only.

The PMU 100 also includes means, such as an input capacitor 114, for protecting the input power source from damage by controlling the rush of current from the power source when the relay switch 106 is closed. The input capacitor 114 can be implemented as a shunt capacitor, for example, or any other suitable device.

The processor 104 is a programmable device such as a digital signal processor, for example. The processor 104 regulates the charging rate of the battery (B) based on parameters measured from the regulator circuit 102. For example, the processor 104 is connected to receive an input voltage signal ($V_{IN}$) and an input current signal ($I_{IN}$) based on a measurement taken from a terminal of the input capacitor 114. The processor 104 is also connected to receive an output voltage signal ($V_{OUT}$) and an output current signal ($I_{OUT}$) from an output terminal of the regulator circuit 102. The processor 104 is connected to receive a battery current signal ($I_{BATT}$) and a battery temperature signal ($I_{BATT}$). The manner in which the processor 104 uses the measured values to control the regulator circuit 102 is discussed herein.

The processor 104 generates a control signal RL for controlling the state of the relay switch 102. The processor 104 compares the input voltage signal ($V_{IN}$) to a minimum input voltage threshold ($V_{IN\_MIN}$) and a maximum input voltage threshold ($V_{IN\_MAX}$), which are derived from the manufacturer's specification for the battery (B). The processor 104 also compares the battery temperature signal ($T_{BATT}$) to a maximum battery temperature threshold ($T_{B\_MAX}$) as determined by the manufacturer's specifications of the battery (B). If either the input voltage signal ($V_{IN}$) or the battery temperature signal ($T_{BATT}$) are within the respective manufacturer's specifications, then the processor 104 generates the control signal RL to close the relay switch 106, thereby connecting the regulator circuit 102 to the input power source (not shown). On the other hand, if the input voltage ($V_{IN}$) and the battery temperature ($T_{BATT}$) signal fall outside of the respective manufacturer's specifications, then the processor 104 generates the control signal RL to open the relay switch 106, thereby disconnecting the regulator circuit 102 from the input power source.

The processor 104 also generates a control signal DT for controlling the operational state of the regulator circuit 102. The control signal DT is a pulse width modulated signal that is generated by the processor 104 based on temperature compensation processing performed during voltage mode control and current mode control processing. The generation of the DT control signal is discussed herein with respect to the voltage mode control and the current mode control of the processor 104.

Figure 2:
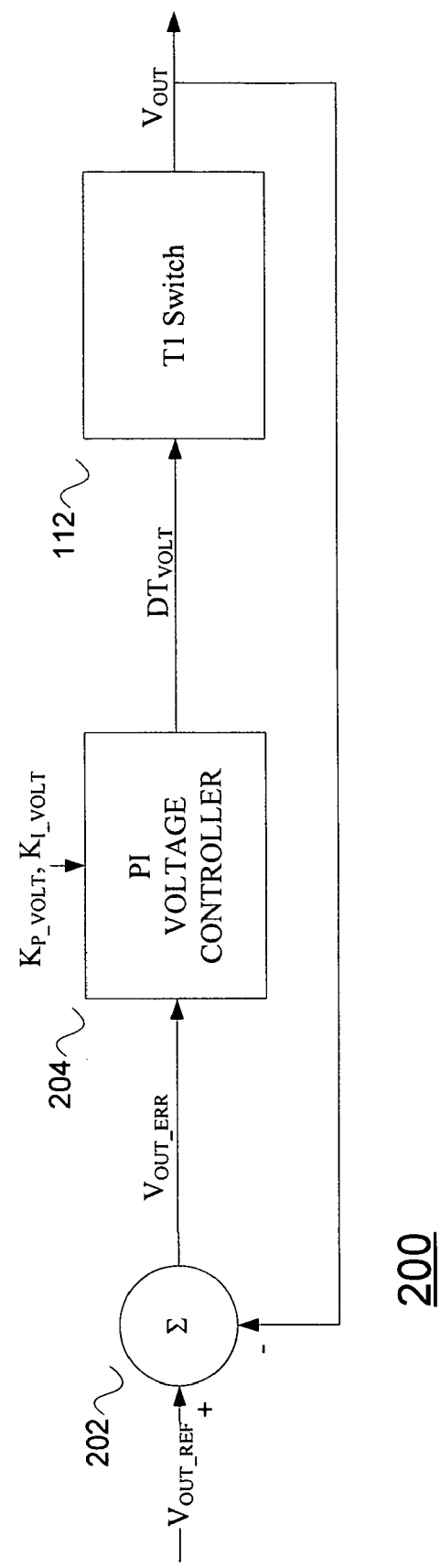
FIG. 2 illustrates a voltage mode control circuit in accordance with an exemplary embodiment.

FIG. 2 is a block diagram of an exemplary embodiment directed to a voltage mode control circuit 200. Voltage mode control (VMC) processing is implemented through a combination of the processor 104 and regulator circuit 102. The processor 104 initiates VMC processing when the battery (B) is at least half charged. During VMC, the battery (B) controls the battery current ($I_{BATT}$). The processor 104 monitors the battery current ($I_{BATT}$) so that the current limit of the battery is not exceeded, and adjusts the battery current ($I_{BATT}$) by controlling the output voltage ($V_{OUT}$).

The voltage mode control circuit can include a summing device, or summer 202, a proportional-integral (PI) voltage controller 204, and the transistor switch 112 of the regulator circuit 102.

The summer 202 and the PI voltage controller 204 can be implemented in the processor 104. The summer 202 combines (e.g., adds) the negative of the output voltage ($V_{OUT}$) to a reference output voltage ($V_{OUT\_REF}$) value to generate an output voltage error value ($V_{OUT\_ERR}$) according to Equation 1.

$$V_{OUT\_ERR} = V_{OUT\_REF} + (-V_{OUT}) \quad (1)$$

The reference output voltage ($V_{OUT\_REF}$) can be a set point voltage that is desired for the battery during the charging process. The output of the summer 202 represents an output voltage error ($V_{OUT\_ERR}$) that is input to the PI voltage controller 204. The PI voltage controller 204 receives the output voltage error ($V_{OUT\_ERR}$) and performs a proportional correction and an integral correction on the output voltage error value so that the error can be reduced or eliminated. During proportional correction, the error value is multiplied by a negative proportional voltage constant ($K_{P\_VOLT}$) according to Equation 2.

$$P_{VOLT}f(T_{BATT}) = K_{P\_VOLT} \cdot V_{OUT\_ERR}(t) \quad (2)$$

The proportional voltage constant ($K_{P\_VOLT}$) provides a correction to reduce the error between the output voltage ($V_{OUT}$) and the output reference voltage ($V_{OUT\_REF}$). The proportional voltage constant ($K_{P\_VOLT}$) can be selected from a temperature compensation curve that correlates battery temperature ($T_{BATT}$) and battery current ($I_{BATT}$) and also may be used to select output voltage ($I_{OUT}$). This association is based on manufacturer's specifications for the battery (B). The PI voltage controller 204 receives the error value ($V_{OUT\text{-}ERR}$) from the summer 202 and uses this value to select the proportional voltage constant ($K_{P\_VOLT}$).

During integral correction, the error value ($V_{OUT\_ERR}$) is integrated over a time t according to Equation 3.

$$I_{VOLT}f(T_{BATT}) = K_{I\_VOLT} \int_0^t V_{OUT\_ERR}(t) \quad (3)$$

The result of the integration is multiplied by a negative integral constant ($K_{I\_VOLT}$) to generate an average error value. The PI controller 204 adds the proportional correction result and the integral correction result to generate the control signal DT according to Equation 4.

$$DT_{VOLT}f(T_{BATT}) = P_{VOLT}f(T_{BATT}) + I_{VOLT}f(T_{BATT}) \quad (4)$$

The control signal DT can have a 50% duty cycle (or more, or less) that is represented as a ratio of the output voltage ($V_{OUT}$) to the input voltage ($V_{IN}$) as a function of the battery temperature ($T_{BATT}$).

$$DutyCycle_{VOLT} = \frac{V_{OUT}}{V_{IN}} f(T_{BATT}) \quad (5)$$

The PI controller 204 outputs the control signal DT to the transistor switch 112. The duty cycle of the control signal DT controls the switching cycle of the transistor switch 112 and thereby the amount of time the input voltage ($V_{IN}$) can directly influence the output voltage ($V_{OUT}$) level.

Figure 3:
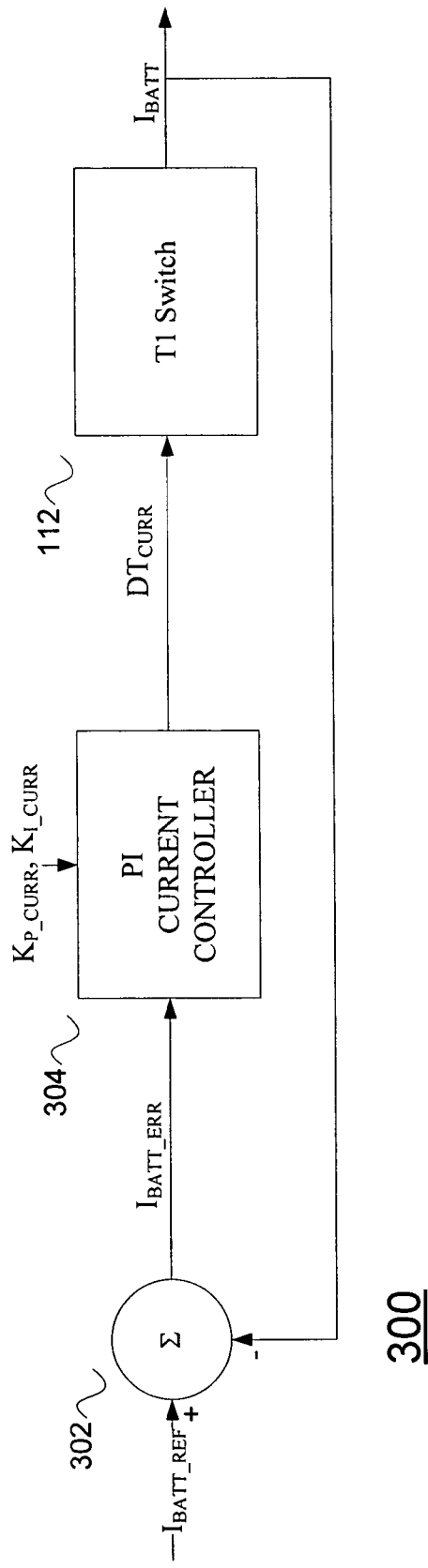
FIG. 3 illustrates a current mode control circuit in accordance with an exemplary embodiment.

FIG. 3 is block diagram of an exemplary embodiment directed to a current mode control (CMC) circuit 300. Like VMC processing, current mode control processing can be implemented through a combination of the processor 104 and the regulator circuit 102. The processor 104 initiates CMC processing when the battery (B) is less than half charged. During CMC, the processor 104 monitors and adjusts the output voltage ($V_{OUT}$) of the battery so that the voltage limit of the battery (B) is not exceeded. The processor 104 adjusts the output voltage ($V_{OUT}$) by controlling the battery current ($I_{BATT}$). The CMC circuit 300 includes a summer 302, a PI current controller 304, and the transistor switch 112.

The summer 302 and the PI current controller 304 are implemented in the processor 104. The summer 302 combines the negative of the battery current ($I_{BATT}$) to a reference battery current value ($I_{BATT\_REF}$) according to Equation 6.

$$I_{BATT\_ERR} = I_{BATT\_REF} + (-I_{BATT}) \quad (6)$$

The reference battery current ($I_{BATT\_REF}$) is determined by the manufacturer's specification. The output of the summer 302 is an error value ($I_{BATT\_ERR}$) that represents an amount the measured battery current deviates from the reference battery current ($I_{BATT\_REF}$). The summer 302 outputs the error value ($I_{BATT\_ERR}$) to the PI current controller 304.

The PI current controller 304 performs a proportional correction and an integral correction on the error value ($I_{BATT\_ERR}$) to reduce or eliminate the battery current error. The proportional current constant ($K_{P\_CURR}$) and the integral current constant ($K_{I\_CURR}$) provide compensation values that reduces the error between the battery current ($I_{BATT}$) and the battery current reference value ($I_{BATT\_REF}$) according to Equations 7 and 8.

$$P_{CURR} f(T_{BATT}) = K_{P\_CURR} \cdot I_{BATT\_ERR}(t) \quad (7)$$

$$I_{CURR} f(T_{BATT}) = K_{I\_CURR} \int_0^t I_{BATT\_ERR}(t) \quad (8)$$

In this instance, the proportional current constant ($K_{P\_CURR}$) and the integral constant ($K_{I\_CURR}$) can be selected from the temperature compensation curve with respect to the reference battery current. The PI current controller 304 receives the error value ($I_{BATT-ERR}$) from the summer 302 and selects the appropriate proportional current constant ($K_{P\_CURR}$) and integral current constant ($K_{I\_CURR}$) based on this value. The proportional correction result and the integral correction result are added to generate the error correction signal DT according to Equation 9.

$$DT_{CURR} f(T_{BATT}) = P_{CURR} f(T_{BATT}) + I_{CURR} f(T_{BATT}) \quad (9)$$

The control signal DT can have a 50% duty cycle (or lesser or greater) that is represented as a ratio of the battery current ($I_{BATT}$) and the input current $I_{IN}$ as a function of the battery temperature ($T_{BATT}$) according to Equation 10.

$$DutyCycle_{CURR} = \frac{I_{BATT}}{I_{IN}} f(T_{BATT}) \quad (10)$$

The PI current controller 304 outputs the control signal DT to the transistor switch 112. The duty cycle of the control signal DT regulates the switching cycle of the transistor switch 112. and thereby the amount of time the input voltage ($V_{IN}$) can directly influence the output voltage ($V_{OUT}$) level.

In both VMC and CMC processing, the processor 104 can monitor the battery temperature ($I_{BATT}$) to ensure that the temperature limit of the battery (B) is not exceeded. The processor 104 can stop the charging process at any selected time, such as every fifteen minutes at thirty second intervals, so that the battery temperature ($T_{BATT}$) may stabilize. The processor 104 can also monitor the battery charge status to determine when the charge capacity of the battery (B) has been met. The battery charge status can be measured in Amp-Hours, and the processor 104 can stop the charging process when an Amp-Hour limit of the battery (B) is reached. The Amp-Hour limit is provided in the manufacturer's specification for the battery (B).

Figure 4:
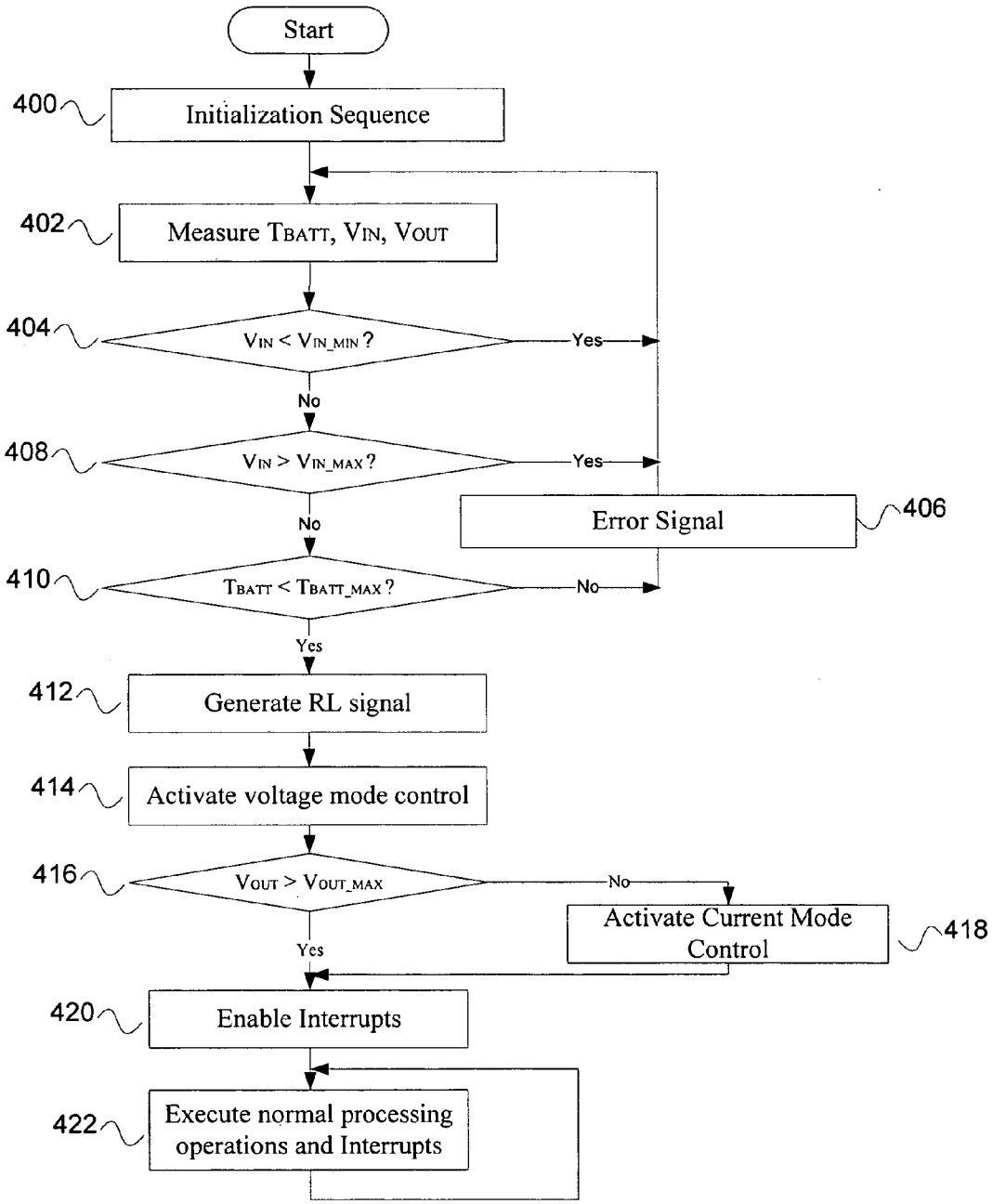
FIG. 4 is a flow diagram of a method of charging the startup battery in accordance with an exemplary embodiment.

FIG. 4 is a flowchart of an exemplary method directed to a main processing module of the battery charging process.

At startup of the fuel cell system, the processor 104 can execute an exemplary initialization sequence in which any or all of the power conditioning unit 100 is tested, all interrupts are disabled, and the control signal RL is generated to open the relay switch 106 and disconnect the power management unit 100 from the power source (step 400). After (and/or before and/or during) initialization, the processor 104 can measure the battery temperature ($T_{BATT}$), the input voltage ($V_{IN}$), and the output voltage ($V_{OUT}$)(step 402) to determine whether the battery (B) is chargeable. To make this determination, the processor 104 compares these measured values to manufacturer specified values.

For example, in a first determination the processor 104 compares the input voltage ($V_{IN}$) to a minimum input voltage value ($V_{IN\_MIN}$)(step 404). If the input voltage ($V_{IN}$) is greater than the minimum input voltage value ($V_{IN\_MIN}$), the processor 104 performs a second determination. However, if the input voltage ($V_{IN}$) is less than the minimum input voltage value ($V_{IN\_MIN}$), the processor 104 generates an error signal (step 406). The processor 104 again measures the battery parameters so that the chargeability of the battery (B) may be determined (step 402).

In the second determination, the processor 104 compares the input voltage ($V_{IN}$) to a maximum input voltage value ($V_{IN\_MAX}$)(step 408). If the measured input voltage ($V_{IN}$) is less than the maximum input voltage value ($V_{IN\_MAX}$), the processor 104 performs a third determination. On the other hand, if the measured input voltage ($V_{IN}$) is greater than the maximum input voltage threshold ($V_{IN\_MAX}$), the processor 104 generates the error signal (step 406). The processor 104 again measures the battery parameters so that the chargeability of the battery (B) may be determined (step 402).

In the third determination, the processor 104 compares the measured battery temperature ($T_{BATT}$) to a maximum battery temperature value ($T_{BATT\_MAX}$) as set by the manufacturer's specification (step 410). If the measured battery temperature ($T_{BATT}$) is less than the maximum battery temperature value ($T_{BATT\_MAX}$), the processor 104 determines that the battery (B) is chargeable. However, if the measured battery temperature ($T_{BATT}$) is greater than the maximum battery temperature ($T_{BATT\_MAX}$), the processor 104 generates an error signal indicating that the battery (B) is not chargeable (step 406). The processor 104 again measures the battery parameters so that the chargeability of the battery (B) may be determined (step 402). Processing returns to step 402 so that the battery temperature ($T_{BATT}$), the input voltage ($V_{IN}$), and the output voltage ($V_{OUT}$) may again be measured.

Thus, the processor 104 determines that the battery (B) is chargeable. The processor 104 also generates the control signal RL to close the relay switch 106, thereby connecting the regulator circuit 102 to the power source (step 412). For example, the processor 104 begins a charging interval by setting the CMC register to 0, initiating VMC processing, and starting a timer that tracks the elapsed time of the charging interval (step 414). The processor 104 monitors the timer so that the charging process can be stopped every fifteen (15) minutes for 30 seconds, to allow the temperature of the battery (B) to stabilize.

After (and/or before, and/or during) initiating the VMC processing, the processor 104 determines the charged state of the battery (B). The processor 104 determines the charged state of the battery (B) by comparing the measured output voltage ($V_{OUT}$) to a maximum output voltage ($V_{OUT\_MAX}$) (step 416). The maximum output voltage ($V_{OUT\_MAX}$) is a value provided by the manufacturer specification of the battery (B). If the measured output voltage ($V_{OUT}$) is greater than the maximum output voltage ($V_{OUT\_MAX}$), the processor 104 remains in the voltage mode control (VMC). On the other hand, if the measured output voltage ($V_{OUT}$) is less than the maximum output voltage ($V_{OUT\_MAX}$), the processor 104 sets the CMC register to 1 and switches to current mode control processing (step 418).

The processor 104 enables interrupt generation (step 420) and performs normal processing functions until an interrupt is generated (step 422).

Figure 5:
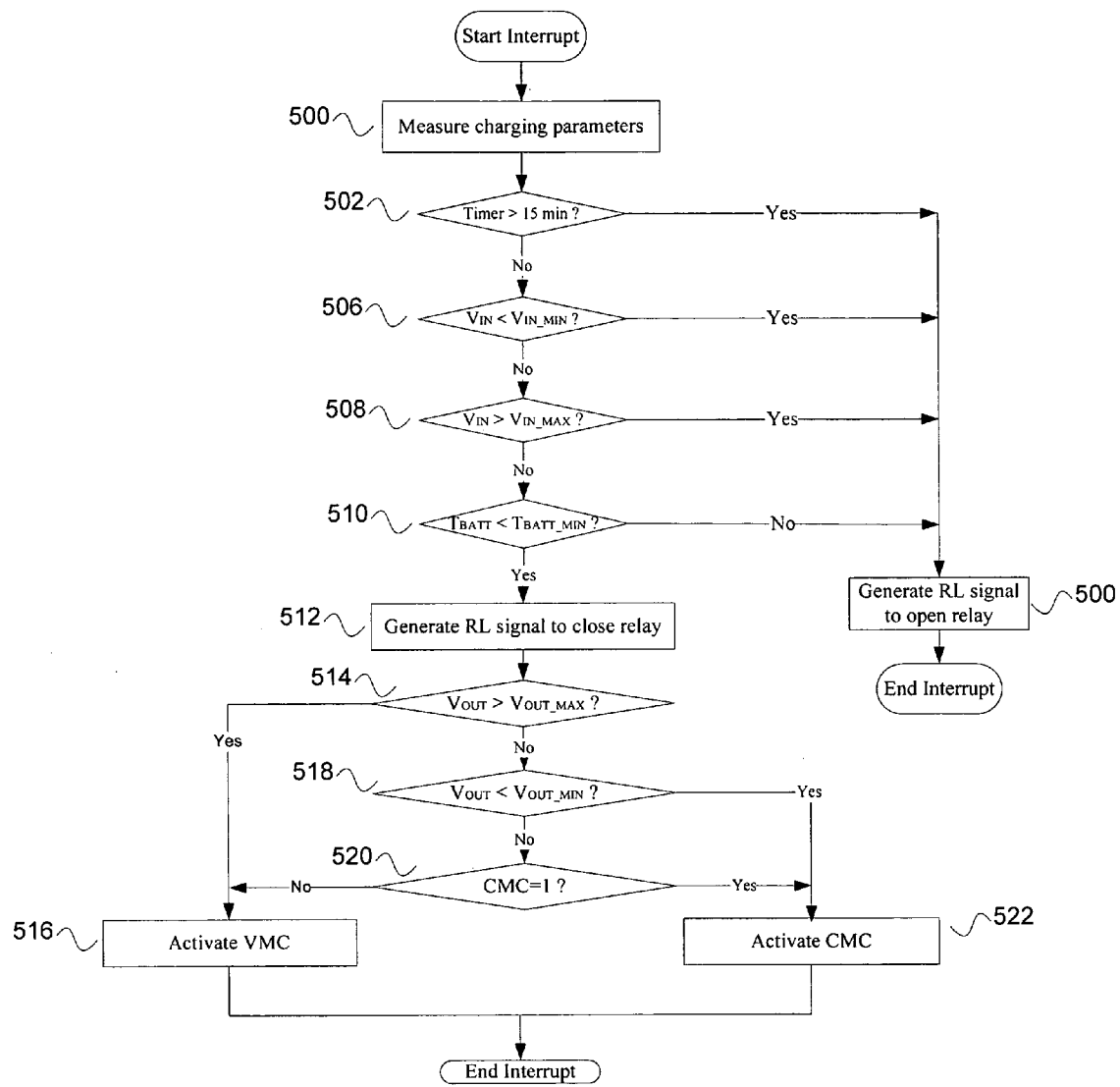
FIG. 5 is a flow diagram of an initialization process for charging the startup battery in accordance with an exemplary embodiment.

FIG. 5 is a flowchart of an exemplary method directed to an interrupt processing module that monitors the mode control processing of the processor 104. The frequency at which the mode control interrupt is generated may be determined by the clock frequency of the processor 104. For example, the mode control interrupt may be generated as desired, such as every 33 μsec for a processor having a 30 kHz switching frequency.

When a mode control interrupt is generated, the processor 104 measures the battery temperature ($T_{BATT}$), the battery current ($I_{BATT}$), the output current ($I_{OUT}$), the output voltage ($V_{OUT}$), the input voltage ($V_{IN}$) and the input current ($I_{IN}$) of the power management unit 100 (step 500). Based on these measured values, the processor 104 determines whether the charging process should be stopped.

For example, the processor 104 determines whether elapsed time of the charging interval exceeds a threshold, such as fifteen minute limit (step 502). If the charging interval does not exceed the time limit then a second determination is performed. However, in this example, if the charging interval is greater than fifteen minutes, the processor 104 generates the control signal RL to open the relay switch 106, thereby stopping the charging process (step 504). The processor 104 returns to the main processing module (step 422). By periodically stopping the charging process every fifteen minutes, the processor 104 can enable the battery (B) to reach a stable temperature. The timer will reset as desired, such as every 10 minutes.

In the second determination, the processor 104 compares the measured input voltage ($V_{IN}$) to the minimum input voltage ($V_{IN\_MIN}$) of the manufacturer's specifications (step 506). If the measured input voltage ($V_{IN}$) exceeds the minimum input voltage ($V_{IN\_MIN}$), the processor 104 performs a third determination. However, in this example, if the measured input voltage ($V_{IN}$) is less than the minimum input voltage value ($V_{IN\_MIN}$), the processor 104 generates the control signal RL to open the relay switch 106, thereby stopping the charging process (step 504). The processor 104 exits the interrupt processing module and returns to the main processing module (step 422).

In the third determination, the processor 104 compares the measured input voltage ($V_{IN}$) to a maximum input voltage threshold ($V_{IN\_MAX}$) of the manufacturer's specification (step 508). If the measured input voltage ($V_{IN}$) is less than the maximum input voltage value ($V_{IN\_MAX}$), the processor 104 performs a fourth determination. On the other hand, if the measured input voltage ($V_{IN}$) is greater than the maximum input voltage threshold ($V_{IN\_MAX}$), the processor 104 generates the control signal RL to open the relay switch 106, thereby stopping the charging process (step 504). The processor 104 exits the interrupt processing module and returns to the main processing module (step 422).

In the fourth determination, the processor 104 compares the measured battery temperature ($T_{BATT}$) to a minimum battery temperature value ($T_{BATT\_MIN}$) of the manufacturer's specification (step 510). If the measured battery temperature ($T_{BATT}$) is less than the minimum battery temperature value ($T_{BATT\_MIN}$), the processor 104 generates the control signal RL to close the relay switch 106 and continues charging the battery (B)(step 512). However, in this example, if the measured battery temperature ($T_{BATT}$) is greater than the minimum battery temperature ($T_{BATT\_MIN}$), the processor 104 generates the control signal RL to open the relay switch 106, thereby stopping the charging process (step 504). The processor 104 exits the interrupt processing and returns to the main processing module (step 422).

After determining that the charging process of the battery (B) should be continued, the processor 104 determines whether the existing mode control should be changed or maintained.

For example, the processor 104 compares the measured output voltage ($V_{OUT}$) to a maximum output voltage threshold ($V_{OUT\_MAX}$). of the manufacturer's specification (step 514). If the measured output voltage ($V_{OUT}$) is less than the maximum output voltage value ($V_{OUT\_MAX}$), the processor 104 performs a fifth determination. However, in this example, if the measured output voltage ($V_{OUT}$) is greater than the maximum output voltage value ($V_{OUT\_MAX}$), the processor 104 changes or maintains processing in the VMC by setting the CMC register value to zero (step 516). The processor 104 then determines whether charging capacity of the battery (B) has been exceeded by determining whether a threshold, such as an AMP-HOUR limit of the battery has been met.

In the fifth determination, the processor 104 compares the output voltage ($V_{OUT}$) to a minimum output voltage ($V_{OUT\_MIN}$) value as recommended by the manufacturer's specification (step 518). If the measured output voltage ($V_{OUT}$) is greater than the minimum output voltage ($V_{OUT\_MIN}$) value, the processor 104 performs a sixth determination. However, in this example, if the measured output voltage ($V_{OUT}$) is less than the minimum output voltage ($V_{OUT\_MIN}$) value, the processor 104 switches to CMC processing by setting the CMC register value to one (1)(step 522). The processor 104 exits interrupt processing and returns to the main processing module (Step 422).

In the sixth determination, the processor 104 determines whether the present mode control is the current mode control (step 520). If the CMC register value is 1, the processor 104 continues to charge the battery (B) under current mode control processing, and returns to the main processing module (step 522). However, in this example, if the current mode control register value is not equal to 1, the processor 104 determines whether the charging capacity has been met by determining whether a threshold, such as an AMP-HOUR limit of the battery (B) has been exceeded (step 516). After making this determination the processor 104 returns to the main processing module.

While the invention has been described with reference to specific embodiments, this description is merely representative of the invention and is not to be construed as limiting the invention. Various modifications and applications may occur to those skilled in the art without departing from the true spirit and scope of the invention as defined by the appended claims.

What is claimed is:

1. A method of charging a battery in a power management unit, the method comprising:
measuring a battery parameter;
determining a charge level of the battery based on the battery parameter;
selecting a first charging mode based on the charge level; and
adjusting a charge rate of the battery based on a temperature of the battery by opening and closing a relay switch connecting a power regulator with a power source.

2. The method of claim 1, comprising:
determining whether the battery is chargeable based on the measured battery parameter; and
connecting the battery to a power source when the battery is chargeable.

3. The method of claim 1, comprising:
selecting a voltage control charging mode when an output voltage of the battery is greater than a first threshold.

4. The method of claim 1, comprising:
selecting a current control charging mode when the output voltage is less than a first threshold.

5. The method of claim 3, wherein the measured battery parameter is a battery voltage and the voltage control charging mode comprises:
comparing a reference output voltage and the measured battery voltage to obtain a difference value;
processing the difference value in a proportional-integral controller based on the battery temperature; and
regulating the charging rate of the battery based on an output signal of the proportional-integral controller.

6. The method of claim 4, wherein the measured battery parameter is a battery current and the current charging mode comprises:
comparing a reference battery current and the measured battery current to obtain a difference value;
processing the difference value in a proportional-integral controller based on the battery temperature; and
regulating the charging rate of the battery based on an output signal of the proportional-integral controller.

7. The method of claim 3, comprising:
measuring an additional battery parameter;
comparing the additional battery parameter to a second threshold; and
aborting the charging process of the battery based on the comparison.

8. The method of claim 7, wherein the additional battery parameter is an elapsed charging time and the second threshold is a charging interval value.

9. The method of claim 7, wherein the additional battery parameter is an observed input voltage and the second threshold is a lower threshold.

10. The method of claim 7, wherein the additional battery parameter is an input voltage and the second threshold is an upper threshold.

11. The method of claim 7, wherein the additional battery parameter is the battery temperature and the second threshold is a lower threshold.

12. The method of claim 7, wherein the additional battery parameter is the output voltage, the method comprising:
comparing the additional battery parameter to a third threshold; and
selecting a second charging mode based on the comparison.

13. The method of claim 12, wherein the additional battery parameter is the measured output voltage and the third threshold is an upper threshold, the method comprising:
selecting the voltage charging mode when the measured output voltage is greater than the upper threshold.

14. The method of claim 12, wherein the additional battery parameter is the measured output voltage, the third threshold is an upper threshold, and a fourth is a lower threshold, the method comprising:
selecting the voltage charging mode when the measured output voltage is not greater than the third threshold, not less than the fourth threshold, and a current charging mode register value is zero.

15. The method of claim 12, wherein the additional battery parameter is the measured output voltage, the third threshold is an upper threshold, and a fourth threshold is a lower threshold, the method comprising:
selecting the current charging mode when the measured output voltage is not greater than the third threshold, and is less than the fourth threshold.

16. The method of claim 12, wherein the additional battery parameter is the measured output voltage, the third threshold is an upper threshold, and a fourth threshold is a lower threshold, the method comprising:
selecting the current charging mode when the measured output voltage is not greater than the third threshold, is not less than the fourth threshold, and the current charging mode register value is one.

17. A processor for charging a battery in a power management unit having a power regulator, wherein the processor is connected to receive measurement signals from the power regulator and is connected to send control signals to the power regulator, and wherein the processor is programmed to perform a method comprising:
receiving an output voltage signal and a battery temperature signal from the power regulator;
comparing the output voltage to a first threshold to determine a charge level of the battery;
selecting a first charging mode based on the comparison;
sending a first control signal to the power regulator to adjust a charging rate of the battery based on the battery temperature;
receiving an input voltage signal from the power regulator;
comparing the input voltage signal to at least one of a second threshold and third threshold to determine whether the battery is chargeable;
sending a second control signal to close a relay switch and connect the power regulator to a power source when the battery is chargeable;
comparing an elapsed charging time value and a charging interval value; and
sending the second control signal to open the relay switch when the elapsed time is greater than the charging time interval.

18. The method of claim 17, wherein the first charging mode is a voltage mode control when the output voltage is greater than the first threshold.

19. The method of claim 17, wherein the first charging mode is a current mode control when the output voltage is less than the first threshold.

20. The method of claim 18, wherein the voltage mode control comprises:
calculating an error between a reference output voltage and the measured output voltage;
generating a correction signal based on the error; and
sending the correction signal to the power regulator as the first control signal to regulate the charging rate of the battery.

21. The method of claim 19, wherein the current mode control comprises:

calculating an error between a reference battery current and a measured battery current;

generating a correction signal based on the error; and sending the correction signal to the power regulator as the first control signal to regulate the charging rate of the battery.

22. A processor for charging a battery in a power management unit having a power regulator, wherein the processor is connected to receive measurement signals from the power regulator and is connected to send control signals to the power regulator, and wherein the processor is programmed to perform a method comprising:

receiving an output voltage signal and a battery temperature signal from the power regulator;

comparing the output voltage to a first threshold to determine a charge level of the battery;

selecting a first charging mode based on the comparison;

sending a first control signal to the power regulator to adjust a charging rate of the battery based on the battery temperature;

receiving an input voltage signal from the power regulator;

comparing the input voltage signal to at least one of a second threshold and third threshold to determine whether the battery is chargeable;

sending a second control signal to close a relay switch and connect the power regulator to a power source when the battery is chargeable;

comparing the input voltage signal to at least one of a second threshold and third threshold;

comparing the battery temperature to a fourth threshold; and sending the second control signal to open the relay switch and disconnect the power source, when the input voltage is less than the second threshold greater than the third threshold, or the battery temperature is less than the fourth threshold.

23. The method of claim 22, comprising:

selecting a second charging mode when the output voltage is greater than an upper threshold.

24. The method of claim 22, comprising:

selecting a second charging mode when the output voltage is not greater than an upper threshold, not less than a lower threshold, and a current charging mode register value is zero.

25. The method of claim 22, comprising:

selecting a second charging mode when the output voltage is not greater than an upper threshold, and is less than a lower threshold.

26. The method of claim 22, wherein the additional battery parameter is the measured output voltage, the third threshold is an upper threshold, and a fourth threshold is a lower threshold, the method comprising:

selecting the current charging mode when the output voltage is not greater than the third threshold, is not less than the fourth threshold, and the current charging mode register value is one.

27. A power conditioning circuit for charging a battery comprising:

a power regulator having an input power supply; and a processor that regulates a charging rate of the battery based on measured parameters of the power regulator and the battery, wherein the battery is connected across output terminals of the power regulator, and wherein the power regulator further comprises a voltage conversion circuit;

a relay switch connected between an input terminal of the input power supply and the conversion circuit; and an input capacitor connected across input terminals of the conversion circuit.

28. The power conditioning unit of claim 27, wherein the processor is connected to the power regulator to receive an input voltage signal, an input current signal, an output voltage signal, an output current signal, a battery voltage signal, a battery current signal, and a battery temperature signal.

29. The power conditioning unit of claim 27, wherein the processor is connected to send a first control signal and a second control signal to the power regulator.

30. The power conditioning unit of claim 29, wherein the first control signal controls a position of the relay switch, and the second control signal controls a transistor switch of the conversion circuit.

31. A system for charging a battery, comprising:

means for regulating a charging rate of the battery; and means for controlling the regulating means to adjust the charging rate based on measured voltage and temperature values of the battery, wherein the means for regulating comprises a voltage conversion circuit;

a relay switch connected between an input terminal of the input power supply and the conversion circuit; and an input capacitor connected across input terminals of the conversion circuit.

* * * * *

UNITED STATES PATENT AND TRADEMARK OFFICE
CERTIFICATE OF CORRECTION

PATENT NO. : 7,649,342 B2
APPLICATION NO. : 11/635644
DATED : January 19, 2010
INVENTOR(S) : Masoud Hajiaghajani Page 1 of 1

It is certified that error appears in the above-identified patent and that said Letters Patent is hereby corrected as shown below:

On the Title Page Item (75), the inventor's last name is incorrectly spelled "Hajiaghajhani" and should be corrected as follows -- Hajiaghajani --.

Signed and Sealed this
Twenty-eighth Day of February, 2012

David J. Kappos
*Director of the United States Patent and Trademark Office*